(12) United States Patent
Do et al.

(10) Patent No.: US 12,010,699 B2
(45) Date of Patent: Jun. 11, 2024

(54) RESOURCE ALLOCATION FOR UPLINK TRANSMISSIONS IN UNLICENSED SPECTRUM

(71) Applicant: Telefonaktiebolaget LM Ericsson (publ), Stockholm (SE)

(72) Inventors: Tai Do, Lund (SE); Joao Vieira, Hjärup (SE); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 17/422,179

(22) PCT Filed: Jan. 7, 2020

(86) PCT No.: PCT/EP2020/050192
§ 371 (c)(1),
(2) Date: Jul. 10, 2021

(87) PCT Pub. No.: WO2020/144168
PCT Pub. Date: Jul. 16, 2020

(65) Prior Publication Data
US 2022/0086893 A1 Mar. 17, 2022

Related U.S. Application Data

(60) Provisional application No. 62/791,431, filed on Jan. 11, 2019.

(51) Int. Cl.
*H04W 72/23* (2023.01)
*H04W 16/14* (2009.01)
(52) U.S. Cl.
CPC ........... *H04W 72/23* (2023.01); *H04W 16/14* (2013.01)

(58) Field of Classification Search
CPC .............................. H04W 16/14; H04W 72/23
See application file for complete search history.

(56) References Cited

U.S. PATENT DOCUMENTS

| | | | |
|---|---|---|---|
| 2011/0040556 A1* | 2/2011 | Moon | G10L 19/008 704/205 |
| 2015/0131546 A1* | 5/2015 | Seo | H04W 72/04 370/329 |

(Continued)

FOREIGN PATENT DOCUMENTS

| | | |
|---|---|---|
| CN | 108366424 A | 8/2018 |
| CN | 108886452 A | 11/2018 |

(Continued)

OTHER PUBLICATIONS

Author Unknown, "3rd Generation Partnership Project; Technical Specification Group Radio Access Network; NR; Physical layer procedures for data (Release 15)," 3GPP TS 38.214 V15.3.0, Sep. 2018, 3GPP Organizational Partners, 96 pages.

(Continued)

*Primary Examiner* — Ajay Cattungal
(74) *Attorney, Agent, or Firm* — Withrow & Terranova, PLLC

(57) ABSTRACT

Systems and methods related to partial interlace frequency domain resource allocations for uplink transmissions from a wireless device are disclosed. In some embodiments, a method performed by a wireless device comprises receiving a resource allocation for an uplink transmission that allocates resources in one or more partially allocated interlaces and performing an uplink transmission on the allocated resources in the one or more partially allocated interlaces in accordance with the resource allocation. In this manner, a low-complexity approach to support flexible frequency domain resource allocation is provided. In addition, using (Continued)

this approach, an interlace may be shared by two or more wireless devices, which may increase spectral efficiency and reduce latency.

18 Claims, 9 Drawing Sheets

(56) References Cited

U.S. PATENT DOCUMENTS

| | | | |
|---|---|---|---|
| 2016/0330004 | A1* | 11/2016 | Kim .................. H04L 5/0048 |
| 2017/0280476 | A1 | 9/2017 | Yerramalli et al. |
| 2018/0124790 | A1* | 5/2018 | Yerramalli ........ H04W 72/0453 |
| 2018/0146480 | A1 | 5/2018 | Chendamarai Kannan et al. |
| 2018/0234863 | A1 | 8/2018 | Li et al. |
| 2019/0124678 | A1 | 4/2019 | Harada et al. |
| 2019/0334680 | A1* | 10/2019 | Li .................... H04L 5/0051 |
| 2019/0349178 | A1 | 11/2019 | Jia et al. |
| 2021/0368507 | A1* | 11/2021 | Kuang .............. H04W 72/23 |
| 2022/0377791 | A1 | 11/2022 | Nogami et al. |

FOREIGN PATENT DOCUMENTS

| | | |
|---|---|---|
| CN | 109156001 A | 1/2019 |
| EP | 3634055 A1 | 4/2020 |
| GB | 2548922 A | 10/2017 |
| JP | 2017184202 A | 10/2017 |
| WO | 2021001770 A1 | 1/2021 |

OTHER PUBLICATIONS

Nokia et al., "R1-1812660: On uplink signal and channel structures for NR-U," 3GPP TSG RAN WG1 Meeting #95, Nov. 12-16, 2018, Spokane, USA, 18 pages.

International Search Report and Written Opinion for International Patent Application No. PCT/EP2020/050192, dated Mar. 30, 2020, 9 pages.

Notice of Reasons for Rejection for Japanese Patent Application No. 2021-539404, dated Oct. 4, 2022, 11 pages.

Author Unknown, "Technical Specification Group Radio Access Network; Evolved Universal Terrestrial Radio Access (E-UTRA); Base Station (BS) radio transmission and reception (Release 16)," Technical Specification 36.104, Version 16.2.0, Jun. 2019, 3GPP Organizational Partners, 265 pages.

Author Unknown, "Technical Specification Group Radio Access Network; NR; Multiplexing and channel coding (Release 15)," Technical Specification 38.212, Version 15.6.0, Jun. 2019, 3GPP Organizational Partners, 101 pages.

Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.

Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.

Author Unknown, "Technical Specification Group Radio Access Network; Study on NR-based access to unlicensed spectrum (Release 16)," Technical Specification 38.889, Version 16.0.0, Dec. 2018, 3GPP Organizational Partners, 119 pages.

Author Unknown, "5GHZ RLAN; Harmonised Standard covering the essential requirements of article 3.2 of Directive 2014/53/EU," EN 301 893, Version 2.1.1, May 2017, ETSI, 122 pages.

Ericsson, "R1-1909297: UL signals and channels for NR-U," 3GPP TSG-RAN WG1 Meeting #98, Aug. 26-30, 2019, Prague, Czech Republic, 18 pages.

Ericsson, "R1-1909303: Evaluation results for enhanced PUCCH and PRACH designs," 3GPP TSG-RAN WG1 Meeting #98, Aug. 26-30, 2019, Prague, Czech Republic, 25 pages.

Nokia, et al., "R1-1902108: NR-U enhancements for uplink signals and channels," 3GPP TSG RAN WG1 Meeting #96, Feb. 25-Mar. 1, 2019, Athens, Greece, 10 pages.

Qualcomm Inc., "RP-182878: New WID on NR-based Access to Unlicensed Spectrum," 3GPP TSG RAN Meeting #82, Dec. 10-13, 2018, Sorrento, Italy, 8 pages.

Qualcomm, "RP-191581: Guidance on essential functionality for NR-U," 3GPP TSG RAN meeting #84, Jun. 3-6, 2019, Newport Beach, California, 8 pages.

International Search Report and Written Opinion for International Patent Application No. PCT/IB2020/056231, dated Sep. 21, 2020, 13 pages.

Decision to Grant for Japanese Patent Application No. 2021-539404, dated Apr. 18, 2023, 5 pages.

First Office Action for Chinese Patent Application No. 202080008567.7, dated Nov. 18, 2023, 21 pages.

Non-Final Office Action for U.S. Appl. No. 17/624,184, mailed Jan. 18, 2024, 19 pages.

* cited by examiner

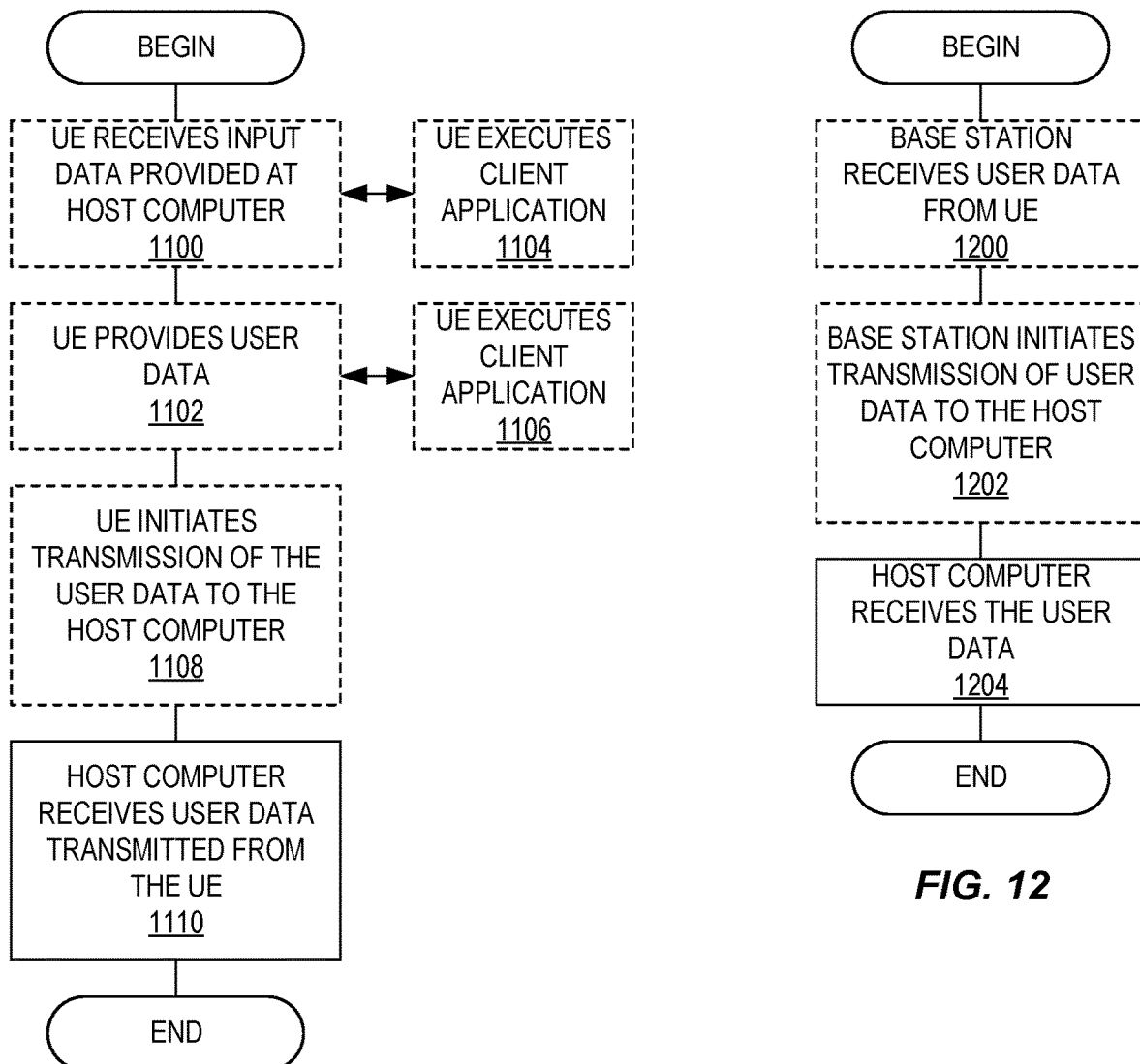

RESOURCE ALLOCATION FOR UPLINK TRANSMISSIONS IN UNLICENSED SPECTRUM

RELATED APPLICATIONS

This application is a 35 U.S.C. § 371 national phase filing of International Application No. PCT/EP2020/050192, filed Jan. 7, 2020, which claims the benefit of provisional patent application Ser. No. 62/791,431, filed Jan. 11, 2019, the disclosures of which are hereby incorporated herein by reference in their entireties.

TECHNICAL FIELD

The present disclosure relates to resource allocation for uplink transmissions in a cellular communications system.

BACKGROUND

Currently the Fifth Generation (5G) cellular system, called New Radio (NR), is being standardized in Third Generation Partnership Project (3GPP). NR is developed for maximum flexibility to support multiple and substantially different use cases. In addition to the typical mobile broadband use case, Machine Type Communication (MTC), Ultra-Low Latency Critical Communications (ULLCC), side-link Device-to-Device (D2D), and several other use cases are also being considered.

In NR, the basic scheduling unit is called a slot. A slot consists of 14 Orthogonal Frequency Division Multiplexing (OFDM) symbols for the normal cyclic prefix configuration. NR supports many different subcarrier spacing configurations and, at a subcarrier spacing of 60 kilohertz (kHz), the OFDM symbol duration is approximately 16.7 microseconds (µs). As an example, a slot with 14 symbols for the same Subcarrier Spacing (SCS) is 250 µs long, including cyclic prefixes.

NR also supports flexible bandwidth configurations for different User Equipment devices (UEs) on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous Physical Resource Blocks (PRBs). Reserved resources can be configured within the bandwidth part. The bandwidth of a bandwidth part equals or is smaller than the maximal bandwidth capability supported by a UE.

NR is targeting both licensed and unlicensed bands, and a study item named NR-based Access to Unlicensed Spectrum (NR-U) started in January 2019. Allowing unlicensed networks, i.e. networks that operate in shared spectrum (or unlicensed spectrum), to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators and, ultimately, to the 3GPP industry as a whole. It is expected that some features in NR will need to be adapted to comply with the special characteristics of the unlicensed band as well as different regulations. Subcarrier spacings of 15 or 30 kHz are the most promising candidates for NR-U OFDM numerologies for frequencies below 6 gigahertz (GHz).

When operating in unlicensed spectrum, many regions in the world require a device to sense the medium as free before transmitting. This operation is often referred to as Listen-Before-Talk (LBT). There are many different variations of LBT depending on which radio technology the device uses and which type of data it wants to transmit at the moment. Common for all variations is that the sensing is done in a particular channel, which corresponds to a defined carrier frequency, and over a predefined bandwidth. For example, in the 5 GHz band, the sensing is done over 20 Megahertz (MHz) channels.

Many devices are capable of transmitting and receiving over a bandwidth that is larger than the bandwidth of a single channel. A device is only allowed to transmit on the channels where the medium is sensed as free. Again, there are different variations of how the sensing should be done when multiple channels are involved.

The adoption of NR in unlicensed bands requires some adaptation to comply with regulations. Two requirements are commonly found in regulations:
  i) Occupied Channel Bandwidth (OCB); and
  ii) Maximum Power Spectral Density (PSD).

For example, both these requirements are enforced for 5 GHz carriers according to European Telecommunications Standards Institute (ETSI) 301 893, while only the maximum PSD requirements are enforced in the United States (US) regulation for 5 GHz.

The OCB requirement is expressed as the bandwidth containing 99% of the power of the signal and is to be between 80% and 100% of the declared Nominal Channel Bandwidth.

Maximum PSD requirements exist in many different regions. For most cases, the requirement is stated with a resolution bandwidth of 1 MHz. For example, the ETSI 301 893 specification requires 10 decibel-milliwatts (dBm)/MHz for 5150-5350 MHz. The implication of the PSD requirement on the physical layer design is that, without proper designs, a signal with small transmission bandwidth will be limited in transmission power. This can negatively affect coverage. That is, the maximum PSD requirement is a binding condition that requires changes to uplink transmissions in unlicensed spectrums.

ETSI regulations mandate a limit on the PSD in the 5 GHz band to 10 dBm/MHz. The ETSI regulation defines the power density to be the mean Equivalent Isotropic Radiated Power (EIRP) over a transmission burst. In order to use the full output power for a smaller allocation, a Block Interleaved Frequency Division Multiple Access (BI-FDMA) approach can be used. FIG. 1 shows an example of an interlace design for NR-U. Assume that the bandwidth is 20 MHz and subcarrier spacing is 30 kHz, after taking into account the guard bands, the total number of effective PRBs is 51, each consisting of 12 subcarriers. Those PRBs are divided into N=5 interlaces, each interlace consisting of M=10 (or 11) equally spaced PRBs. This design offers a good tradeoff between satisfying regulatory requirements on OCB and transmit PSD, overhead required for resource allocation signaling, and the degradation in single-carrier properties of the signal.

In NR, in order to schedule which frequency resource(s) the UEs use to transmit in the uplink, the NR base station, which is referred to as a gNB, typically includes the Resource Allocation (RA) information bits in the Downlink Control Information (DCI). There are two resource allocation types supported in NR (see, e.g., 3GPP Technical Specification (TS) 38.214 V15.3.0). These two RA types are:
  Type 0: RA type 0 is defined by a bitmap of allocated Resource Block Group (RBG). In order to reduce the RA overhead, each RBG consists of p PRBs, where the value of p can be 2, 4, 8, or 16 depending on the size of the bandwidth part. The scheduling granularity is then per p PRBs. The bigger value of p could reduce the number of bits required for RA signaling in compensation for worse scheduling granularity. For example, with 30 kHz subcarrier spacing and 20 MHz bandwidth, type 0 RA requires N_rab=ceil(N_rb/p)=ceil(51/2)=26 bits for RA signaling with p=2, where N_rb is the total number of available PRBs.

Type 1: RA type 1 is defined by the starting PRB and the length (number of PRBs) of the allocated resource in the frequency domain. RA type 1 has scheduling granularity of 1 PRB but is restricted to only support scheduling with contiguous frequency resource blocks. In general, type 1 RA requires less signaling overhead than type 0. For example with 30 kHz SCS and 20 MHz bandwidth, type 1 RA requires N_rab=ceil(log 2(N_rb*(N_rb+1)/2))=11 bits for signaling.

There currently exist certain challenge(s) with respect to uplink resource allocation in NR-U. In unlicensed operations, when the uplink transmission is using an interlaced structure, the legacy RA (type 0 and type 1) cannot be used. More specifically, RA type 0 cannot be used since the scheduling granularity is p>=2 contiguous PRBs, whereas the interlaced structure is normally a PRB-based structure in which the PRBs in each interlace are not contiguous. RA type 1 cannot be used for interlace designs since the PRBs in each interlace are not contiguous.

In further enhanced License Assisted Access (feLAA), which is an earlier release of unlicensed operation compared to NR-U, the uplink RA is performed per interlace unit, instead of PRB or RBG units, with consecutive or certain combinations of interlace groups. In NR-U, the RA scheme of feLAA with per interlace scheduling granularity may not be flexible enough since NR-U interlace structures are aiming to have more flexible RA. For example, some use cases could be:

Different UEs could share the same interlace, i.e. a UE could be scheduled with a partial interlace. This could be useful in case of transmitting a small amount of data or in wideband operations.

Multiple interlaces (with more flexible choice than feLAA) to the same UE.

Different RAs for different signals, e.g. Physical Random Access Channel (PRACH)/Physical Uplink Control Channel (PUCCH)/Sounding Reference Signal (SRS)/Physical Uplink Shared Channel (PUSCH), to the same UE.

One solution to have maximal RA flexibility would be to modify type 0 RA for NR to have p=1. However, the RA signaling overhead would be too much. For example, with 30 kHz SCS and 20 MHz bandwidth, type 0 RA with p=1 would require N_rab=ceil(N_rb/p)=ceil(51/1)=51 bits for RA signaling, i.e., double the number of bits needed in NR.

SUMMARY

Systems and methods related to partial interlace frequency domain resource allocations for uplink transmissions from a wireless device are disclosed. In some embodiments, a method performed by a wireless device comprises receiving a resource allocation for an uplink transmission that allocates resources in one or more partially allocated interlaces and performing an uplink transmission on the allocated resources in the one or more partially allocated interlaces in accordance with the resource allocation. In this manner, a low-complexity approach to support flexible frequency domain resource allocation is provided. In addition, using this approach, an interlace may be shared by two or more wireless devices, which may increase spectral efficiency and reduce latency.

In some embodiments, the resource allocation comprises a first bitmap that indicates one or more allocated interlaces and information that indicates which physical resource blocks are allocated within the one or more allocated interlaces. In some embodiments, the information that indicates which physical resource blocks are allocated within the one or more interlaces consists of an indication of one or more sub-bands of a wideband carrier on which the uplink transmission is allocated. In some embodiments, the wireless device excludes the physical resource block(s) in a guard band between sub-bands even if the physical resource blocks(s) are indicated as part of the resource allocation by the wireless communication network.

In some embodiments, the resource allocation comprises information that indicates the one or more partially allocated interlaces and information that indicates one or more physical resource blocks within the one or more partially allocated interlaces that are allocated for the uplink transmission from the wireless device.

In some embodiments, the resource allocation comprises information that indicates the one or more partially allocated interlaces and, for each partially allocated interlace of the one or more partially allocated interlaces, information that indicates one or more physical resource blocks within the partially allocated interlace that are allocated for the uplink transmission from the wireless device. In some embodiments, the information that indicates the one or more physical resource blocks for each partially allocated interlace is common information that indicates the one or more physical resource blocks for each partially allocated interlace. In some other embodiments, the information that indicates the one or more physical resource blocks for each partially allocated interlace is different information for each partially allocated interlace. In some embodiments, the one or more physical resource blocks are a subset of all resource blocks in the partially allocated interlace.

In some embodiments, each physical resource block of the one or more physical resource blocks includes 12 subcarriers. In some other embodiments, each physical resource block of the one or more physical resource blocks includes less or more than 12 subcarriers.

In some embodiments, the information that indicates the one or more partially allocated interlaces comprises a bitmap of length equal to a number of interlaces that can be allocated where bits in the bitmap indicate which interlaces are partially allocated. In some other embodiments, the information that indicates the one or more partially allocated interlaces comprises a bit sequence that maps to a predefined combination of interlaces that are partially allocated.

In some embodiments, the information that indicates the one or more physical resource blocks is defined using a modified New Radio (NR) Resource Allocation (RA) type 0 resource allocation scheme. In some other embodiments, the information that indicates the one or more physical resource blocks is defined using a modified NR RA type 1 resource allocation scheme. In some embodiments, the uplink transmission is in a wireless communication network with wideband operations consisting of a number of sub-bands, and the wireless device excludes some physical resource block(s) in a guard band between sub-bands or channels even if the physical resource block(s) are scheduled by the wireless communication network.

In some embodiments, the information that indicates the one or more physical resource blocks comprises an index to a predefined table of different allocations of physical resource blocks.

In some embodiments, the one or more partially allocated interlaces comprise two or more partially allocated interlaces, and the information that indicates the one or more physical resource blocks is arranged in a predefined order such that the wireless device can determine which information corresponds to which partially allocated interlace.

In some embodiments, the uplink transmission is in a wireless communication network with wideband operations consisting of a number of sub-bands, and the resource allocation further comprises information that indicates one or more sub-bands on which the uplink transmission is allocated.

In some embodiments, the information that indicates the one or more physical resource blocks indicates which virtual resource blocks are allocated.

In some embodiments, each of the one or more partially allocated interlaces is an interlace that is shared for resource allocations to two or more wireless devices including the wireless device.

In some embodiments, the uplink transmission is a transmission on a physical uplink shared channel. In some other embodiments, the uplink transmission is a transmission on a physical uplink control channel.

Corresponding embodiments of a wireless device are also disclosed. In some embodiments, a wireless device for a cellular communications system is adapted to receive a resource allocation for an uplink transmission that allocates resources in one or more partially allocated interlaces and performs an uplink transmission on the allocated resources in the one or more partially allocated interlaces in accordance with the resource allocation.

In some embodiments, the wireless device comprises one or more transmitters, one or more receivers, and processing circuitry associated with the one or more transmitters and the one or more receivers. The processing circuitry is configured to cause the wireless device to receive the resource allocation for the uplink transmission that allocates resources in the one or more partially allocated interlaces and performs the uplink transmission on the allocated resources in the one or more partially allocated interlaces in accordance with the resource allocation.

Embodiments of a method performed by a base station are also disclosed. In some embodiments, a method performed by a base station comprises transmitting, to a wireless device, a resource allocation for an uplink transmission that allocates resources in one or more partially allocated interlaces.

In some embodiments, the resource allocation comprises a first bitmap that indicates one or more allocated interlaces and information that indicates which physical resource blocks are allocated within the one or more allocated interlaces. In some embodiments, the information that indicates which physical resource blocks are allocated within the one or more interlaces consists of an indication of one or more sub-bands of a wideband carrier on which the uplink transmission is allocated. In some embodiments, the wireless device excludes the physical resource block(s) in a guard band between sub-bands even if the physical resource blocks(s) are indicated as part of the resource allocation by the wireless communication network.

In some embodiments, the resource allocation comprises information that indicates the one or more partially allocated interlaces and information that indicates one or more physical resource blocks within the one or more partially allocated interlaces that are allocated for the uplink transmission from the wireless device.

In some embodiments, the resource allocation comprises information that indicates the one or more partially allocated interlaces and, for each partially allocated interlace of the one or more partially allocated interlaces, information that indicates one or more physical resource blocks within the partially allocated interlace that are allocated for the uplink transmission from the wireless device. In some embodiments, the information that indicates the one or more physical resource blocks for each partially allocated interlace is common information that indicates the one or more physical resource blocks for each partially allocated interlace. In some other embodiments, the information that indicates the one or more physical resource blocks for each partially allocated interlace is different information for each partially allocated interlace. In some embodiments, the one or more physical resource blocks are a subset of all resource blocks in the partially allocated interlace.

In some embodiments, each physical resource block of the one or more physical resource blocks includes 12 subcarriers. In some other embodiments, each physical resource block of the one or more physical resource blocks includes less or more than 12 subcarriers.

In some embodiments, the information that indicates the one or more partially allocated interlaces comprises a bitmap of length equal to a number of interlaces that can be allocated where bits in the bitmap indicate which interlaces are partially allocated. In some other embodiments, the information that indicates the one or more partially allocated interlaces comprises a bit sequence that maps to a predefined combination of interlaces that are partially allocated.

In some embodiments, the information that indicates the one or more physical resource blocks is defined using a modified NR RA type 0 resource allocation scheme. In some other embodiments, the information that indicates the one or more physical resource blocks is defined using a modified NR RA type 1 resource allocation scheme. In some embodiments, the uplink transmission is in a wireless communication network with wideband operations consisting of a number of sub-bands, and the wireless device excludes some physical resource block(s) in a guard band between sub-bands or channels even if the physical resource block(s) are scheduled by the wireless communication network.

In some embodiments, the information that indicates the one or more physical resource blocks within the partially allocated interlace that are allocated for the uplink transmission comprises an index to a predefined table of different allocations of physical resource blocks within the partially allocated interlace.

In some embodiments, the one or more partially allocated interlaces comprise two or more partially allocated interlaces, and the information that indicates the one or more physical resource blocks is arranged in a predefined order such that the wireless device can determine which information corresponds to which partially allocated interlace.

In some embodiments, the uplink transmission is in a wireless communication network with wideband operations consisting of a number of sub-bands, and the resource allocation further comprises information that indicates one or more sub-bands on which the uplink transmission is allocated.

In some embodiments, the information that indicates the one or more physical resource blocks indicates which virtual resource blocks are allocated.

In some embodiments, each of the one or more partially allocated interlaces is an interlace that is shared for resource allocations to two or more wireless devices including the wireless device.

In some embodiments, the uplink transmission is a transmission on a physical uplink shared channel. In some other embodiments, the uplink transmission is a transmission on a physical uplink control channel.

Corresponding embodiments of a base station are also disclosed. In some embodiments, a base station for a cellular communications system is adapted to transmit, to a wireless device, a resource allocation for an uplink transmission that allocates resources in one or more partially allocated interlaces.

In some embodiments, the base station comprises processing circuitry configured to cause the base station to transmit, to the wireless device, the resource allocation for the uplink transmission that allocates resources in the one or more partially allocated interlaces.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 11 and 12 are flow charts that illustrate example methods implemented in a communication system in accordance with some embodiments of the present disclosure.

DETAILED DESCRIPTION

Figure 1:
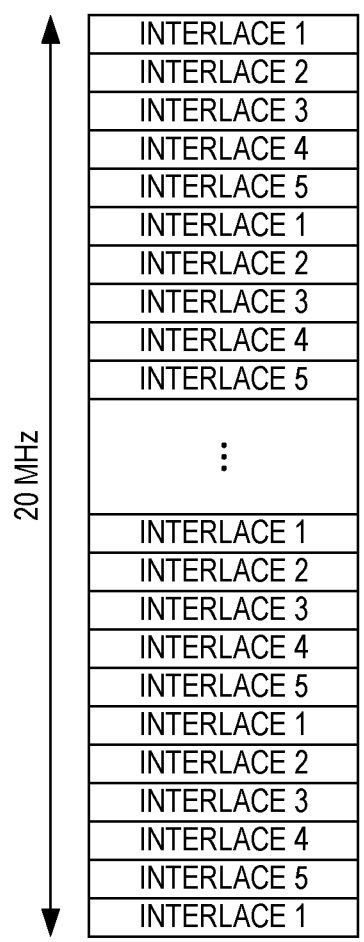
FIG. 1 shows an example of an interlace design for New Radio (NR)-based Access to Unlicensed Spectrum (NR-U)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., network nodes implementing 5G core network functions or network nodes in an Evolved Packet Core (EPC) such, as, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Certain aspects of the present disclosure and their embodiments may provide solutions to the aforementioned or other challenges related to uplink Resource Allocation (RA) in unlicensed spectrum when using an interlace design.

Embodiments of a system and method for determining and signaling a RA for NR based Access to Unlicensed Spectrum (NR-U) uplink transmissions to support partial interlace scheduling are disclosed. Note that while the embodiments described herein focus on NR-U, the present disclosure is not limited thereto. The embodiments disclosed herein may be implemented in any suitable type of wireless communication system, particularly ones implemented in unlicensed spectrum.

In some embodiments of the present disclosure, a method is provided for determining and signaling the RA for NR-U uplink transmissions to support partial interlace scheduling, in which the RA information includes:
- an indicator(s) of allocated interlace(s),
- an indicator(s) of which interlace(s) is(are) to be partially scheduled, and
- RA indicator(s) of the scheduled Physical Resource Block(s) (PRB(s)) in the interlace(s) that is(are) partially scheduled.

Certain embodiments may provide one or more of the following technical advantage(s). For example, embodiments disclosed herein provide a method that is a low complexity approach, in terms of signaling overhead and specification impact, to support flexible RA for uplink transmissions in NR-U. As another example, embodiments disclosed herein provide a method that could increase the spectral efficiency and reduce latency by allowing multiple UEs to share the same interlace for their transmissions.

Figure 2:
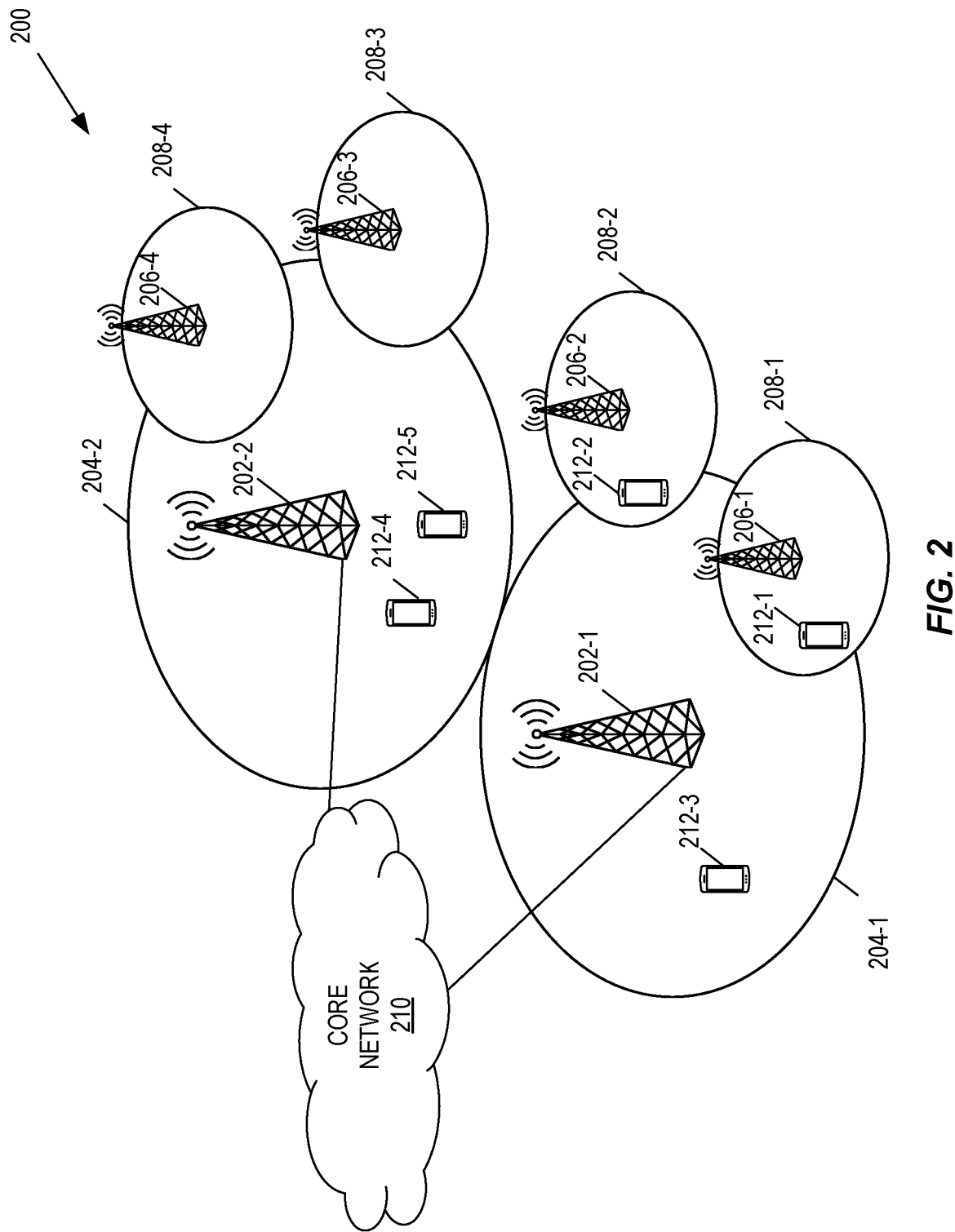
FIG. 2 illustrates one example of a cellular communications network in which embodiments of the present disclosure may be implemented.

FIG. 2 illustrates one example of a cellular communications network 200 according to some embodiments of the present disclosure. In the embodiments described herein, the cellular communications network 200 is a 5G NR-U network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

A number of embodiments will now be described. Note that while these embodiments are described separately, they may be used separately or used together in any desired combination.

Embodiment #1: In this embodiment, a method of determining and signaling the RA for NR-U uplink transmissions to support partial interlace scheduling is performed, in which the RA information includes:

an indicator(s) of which interlace(s) is(are) to be partially scheduled (i.e., partially allocated or, in other words, shared), and
  indicator(s) (which may be referred to herein as "RA indicators" or "PRB indicators") of the scheduled (i.e., allocated) PRB(s) in the interlace(s), which are partially scheduled (i.e., shared).

In addition, the RA information may include an indicator(s) of allocated interlace(s), if any full interlaces (i.e., non-shared interlaces) are allocated.

As an aspect of this embodiment, a PRB unit often includes 12 subcarriers but could also include less or more than 12 subcarriers.

As another aspect of this embodiment, an interlace that is not indicated as partially allocated in the RA information is implicitly understood as fully allocated (non-shared) and the scheduled UE can transmit in all PRBs of that interlace. In this regard, it should be noted that the RA information may include a single set of indicator(s) of allocated interlace(s), where the allocated interlace(s) may be partially or fully allocated. The UE is able to determine that an allocated interlace is partially allocated if corresponding indictor(s) of one or more allocated PRBs in the allocated interlace is also included in the RA information. In other words, the indicator(s) of the partially allocated interlace(s) may or may not, by itself, indicate to the UE that the allocated interlace(s) is partially allocated. In other words, in some embodiments, separate indicators may be included in the RA information for fully allocated interlaces and partially allocated interlaces. In some other embodiments, a common indicator(s) is included in the RA information for both fully and partially allocated interlaces, where the UE is then able to determine which allocated interlace(s) is(are) partially allocated by determining whether indicator(s) of allocated PRB(s) for the allocated interlaces is(are) also included in the RA information.

In this embodiment, the indicator of which interlaces are allocated can be any one of the following.

The indicator of which interlaces are allocated can be a bitmap of length equal to the number of interlaces.
  The indicator of which interlaces are allocated can be a bit sequence that maps to a predefined combination of interlaces. For example, if up to L interlaces out of M interlaces are allocated, the number of bits in the sequence can be ceil(log 2(M choose L)). In another example, the indicator of which interlaces are allocated can be a bit sequence indexing the row (or column) of a predefined table where each row (or column) specifies one interlace or different combinations of interlaces.

In this embodiment, the indicator(s) of which interlaces are partially allocated can be one of the following.

The indicator(s) of which interlaces are partially allocated can be a bitmap of length equal to the number of interlaces.
  The indicator(s) of which interlaces are partially allocated can be a bit sequence that maps to predefined combinations of interlaces that are partially allocated. For example, if up to K interlaces out of M interlaces can be partially allocated, the number of bits in the sequence can be ceil(log 2(M choose K)). Another example, the indicator(s) of which interlaces are partially allocated can be a bit sequence indexing the row (or column) of a predefined table where each row (or column) specifies one interlace or different combinations of interlaces.

In a variation of this embodiment, the indicators can be separately encoded or a subset of them can be jointly encoded.

Embodiment #2: In this embodiment, the PRB indicator of the allocated PRB(s) in an interlace that is partially allocated can be defined using RA type 0 as for NR (see 3GPP Technical Specification (TS) 38.214 V15.3.0) with the following modifications:

i. The (non-contiguous) PRBs in the allocated interlace are re-indexed to have consecutive indices from 1 to N_rb_intl, where N_rb_intl is the total number of PRBs in the interlace. Alternatively, the bits of the type 0 indicator are re-interpreted to refer to PRBs within an interlace.
  ii. The number of PRBs p in each RBG could be 1 or more.

Embodiment #3: In this embodiment, the PRB indicator of the allocated PRB(s) in an interlace that is partially allocated can be defined using RA type 1 as for NR (see 3GPP TS 38.214 V15.3.0) with the following modifications:

i. The (non-contiguous) PRBs in the allocated interlace are re-indexed to have consecutive indices from 1 to N_rb_intl, where N_rb_intl is the total number of PRBs in the interlace.
  ii. The consecutive available PRBs in the interlace (with consecutive indices) are scheduled instead of the physically contiguous PRBs as in NR. Alternatively, the bits of the type 1 indicator are just re-interpreted to refer to the start and length of the contiguous PRBs within an interlace.

Embodiment #4: In this embodiment, the PRB indicator of the allocated PRB(s) in an interlace that is partially allocated can be defined using RA type 1 as for NR (see 3GPP TS 38.214 V15.3.0) with the following modifications:
  i. The (non-contiguous) PRBs in the allocated interlace are re-indexed to have consecutive indices from 1 to N_rb_intl, where N_rb_intl is the total number of PRBs in the interlace.
  ii. Multiple starting positions across the range of the re-indexed PRBs are scheduled by a bit sequence.
  iii. The same or a variable length of contiguous PRBs, which can range from 1 or more, is assigned for each allocated starting position.

Embodiment #5: In this embodiment, the PRB indicator of the allocated PRB(s) in an interlace that is partially allocated indexes a row of a predefined table, where different rows in the predefined table contain different allocations of PRBs within the interlace.

Embodiment #6: In this embodiment, if multiple interlaces are partially allocated, the PRB indicators of the partially allocated interlaces can be arranged according to a predefined order (e.g., in increasing order of interlace index) so that the UEs can determine which PRB indicator corresponds to which partially allocated interlace.

Embodiment #7: In this embodiment, in systems with wideband operations consisting of a number of sub-bands, if the type 1 based PRB indicator in Embodiment #3 is used, the UEs may puncture (i.e., exclude) some PRBs in the guard band between sub-bands or channels even if those PRBs are scheduled by the gNB.

Embodiment #8: In this embodiment, in systems with wideband operations consisting of a number of sub-bands, if the RA signaling is designed per sub-band, an additional sub-band bitmap could be included in the RA information to schedule multiple sub-bands.

Embodiment #9: In this embodiment, the RA within an interlace consists of a number of Virtual Resource Blocks (VRBs). Either a full or partial interlace allocation consists of a predefined mapping from VRBs to PRBs. As one non-limiting example, the VRB-to-PRB mapping can be an interleaved mapping. The PRB indicator for the corresponding interlace thus indicates which VRBs are allocated.

Figure 3:
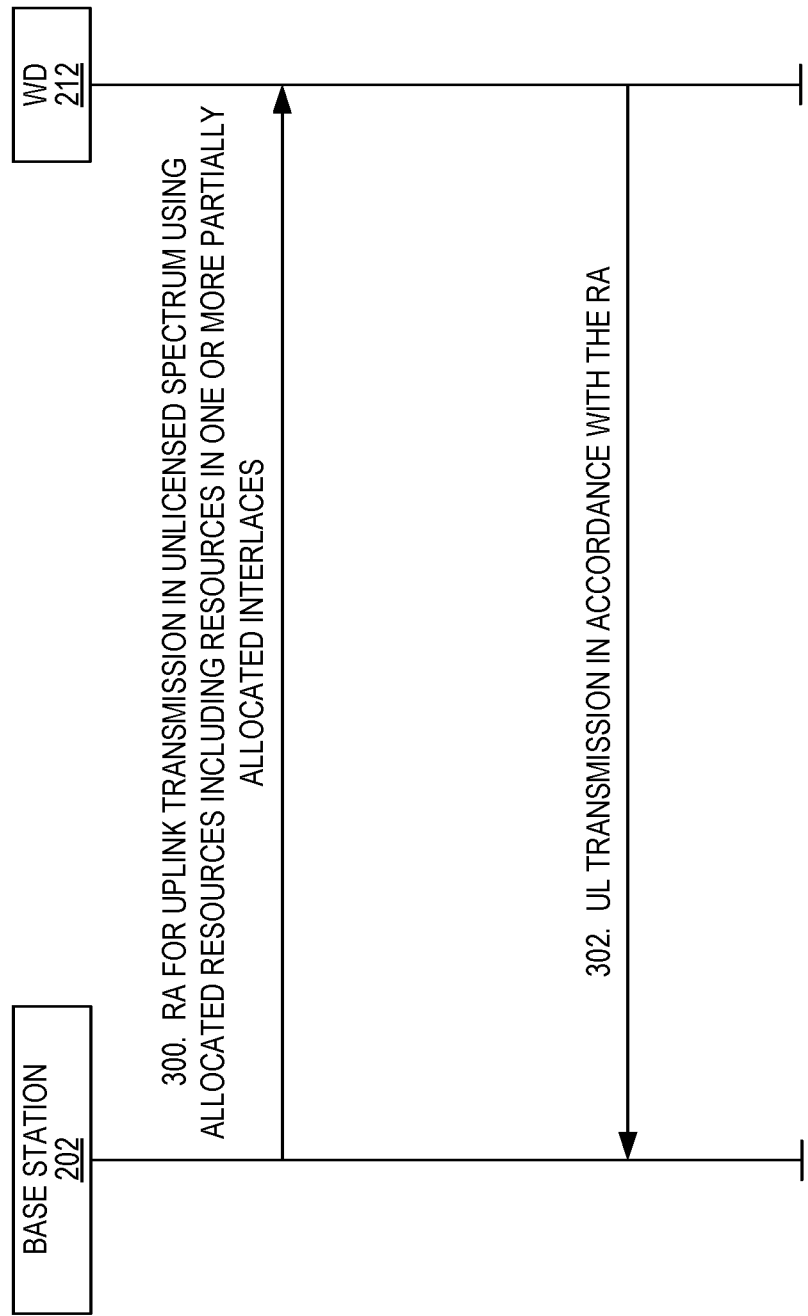
FIG. 3 illustrates the operation of a network node and a wireless device in accordance with at least some aspects of embodiments of the present disclosure.

FIG. 3 illustrates the operation of a network node (e.g., a base station 202) and a wireless device (e.g., a wireless device 212) in accordance with at least some aspects of Embodiments #1 through Embodiment #9 described above. In this example, the network node is a base station 202, and the wireless device is a wireless device 212. As illustrated, the base station 202 transmits, to the wireless device 212, an RA for an uplink transmission in unlicensed spectrum using allocated resources including resources in one or more partially allocated interlaces (step 300). In some embodiments, the RA is an RA for an uplink transmission by the wireless device 212 in an NR-U cell. In some embodiments, the RA is included in Downlink Control Information (DCI) transmitted on a Physical Downlink Control Channel (PDCCH). As described above, the RA includes RA information including an indicator(s) of a partially allocated interlace(s) and a PRB indicator(s) of the PRB(s) in the partially allocated interlace(s) that indicates the PRB(s) within the partially allocated interlace(s) that is(are) allocated for the wireless device 212. In addition, the RA information may include an indicator(s) of an allocated interlace(s), if any, that is fully, rather than partially, allocated for the wireless device 212. Additional details regarding the RA information are provided above and, as such, are not repeated here. However, it is to be understood that all of the details described above (e.g., with respect to Embodiments #1 through #9) are equally applicable here. Thus, for example, all of the details described above with respect to the PRB indicator (e.g., with respect to Embodiments #2, #3, #4, #5, #6, and #9) are equally applicable here.

The wireless device 212 receives the RA and performs the uplink transmission in accordance with the RA (step 302). Thus, with respect to the partially allocated interlace(s), the wireless device 212 performs the uplink transmission using the indicated PRB(s) in the partially allocated interlace(s), in accordance with the RA information.

Figure 4:
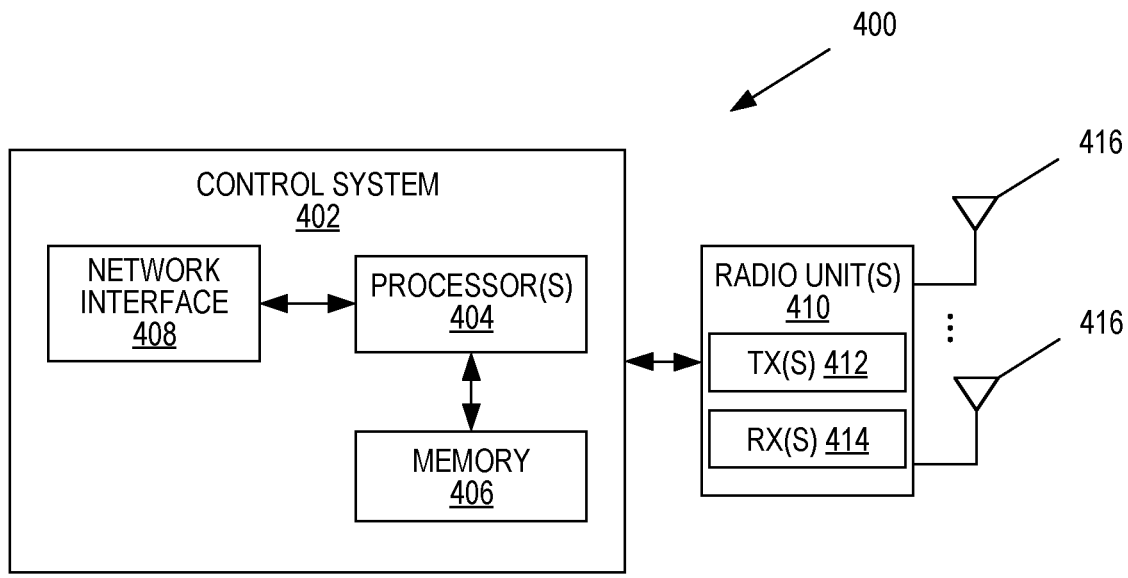
FIGS. 4 through 6 illustrate example embodiments of a radio access node.

FIG. 4 is a schematic block diagram of a radio access node 400 according to some embodiments of the present disclosure. The radio access node 400 may be, for example, a base station 202 or 206. As illustrated, the radio access node 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the radio access node 400 includes one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a radio access node 400 as described herein (e.g., one or more functions of a network node or base station 202 as described above). In some embodiments, the function(s) are implemented in software that is stored, e.g., in the memory 406 and executed by the one or more processors 404.

Figure 5:
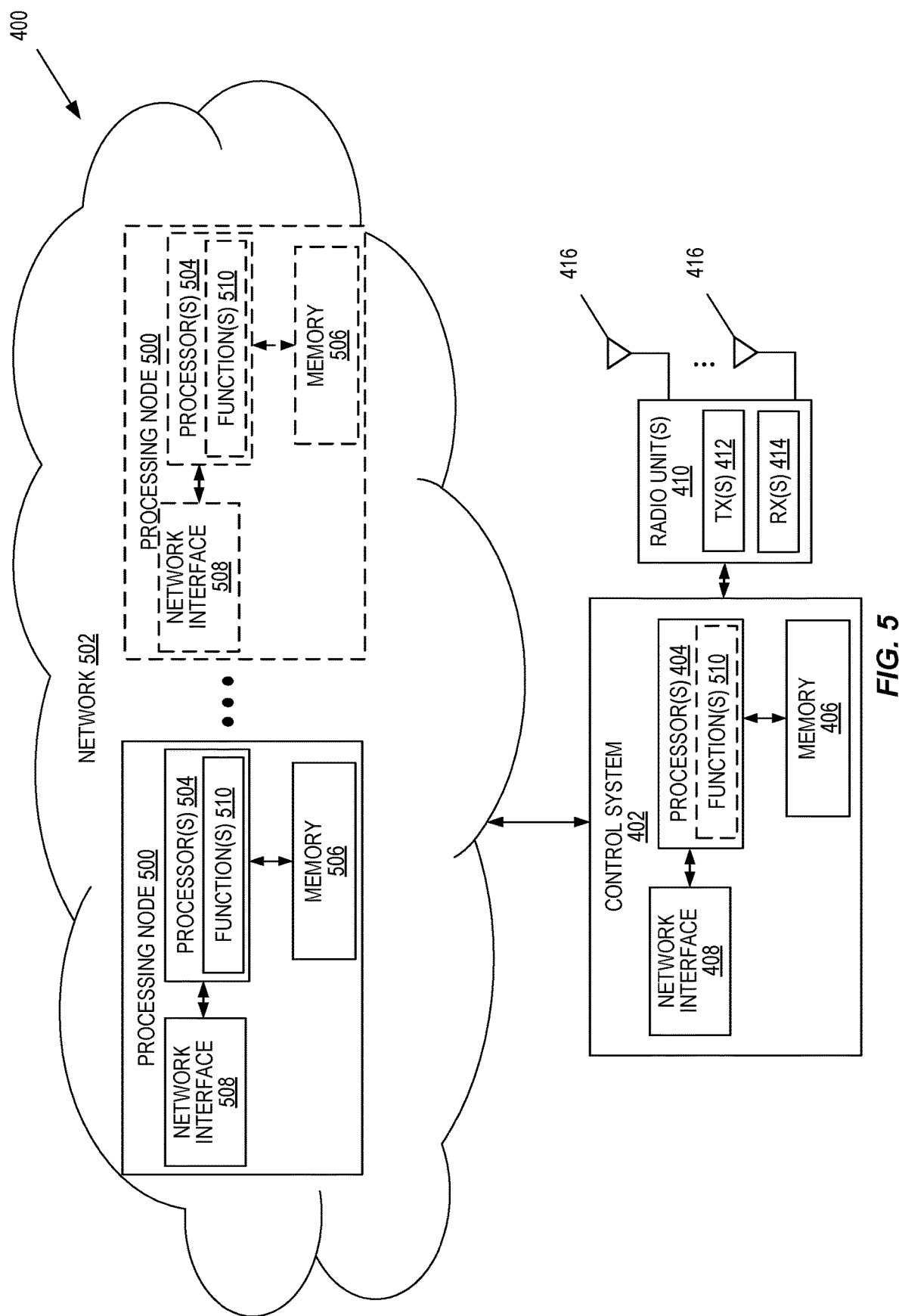

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node(s) in a network(s)). As illustrated, in this example, the radio access node 400 includes the control system 402 that includes the one or more processors 404 (e.g., CPUs, ASICs, FPGAs, and/or the like), the memory 406, and the network interface 408 and the one or more radio units 410 that each includes the one or more transmitters 412 and the one or more receivers 414 coupled to the one or more antennas 416, as described above. The control system 402 is connected to the radio unit(s) 410 via, for example, an optical cable or the like. The control system 402 is connected to one or more processing nodes 500 coupled to or included as part of a network(s) 502 via the network interface 408. Each processing node 500 includes one or more processors 504 (e.g., CPUs, ASICs, FPGAs, and/or the like), memory 506, and a network interface 508.

In this example, functions 510 of the radio access node 400 described herein (e.g., one or more functions of a network node or base station 202 as described above) are implemented at the one or more processing nodes 500 or distributed across the control system 402 and the one or more processing nodes 500 in any desired manner. In some particular embodiments, some or all of the functions 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 (e.g., one or more functions of a network node or base station 202 as described above) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
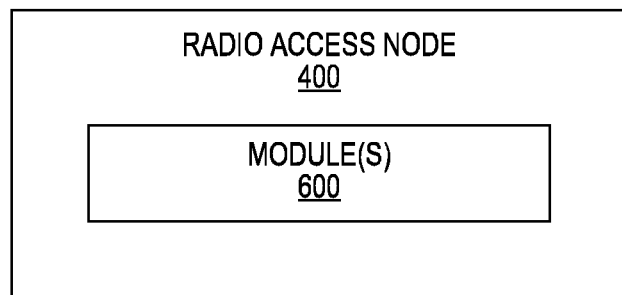

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein (e.g., one or more functions of a network node or base station 202 as described above). This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
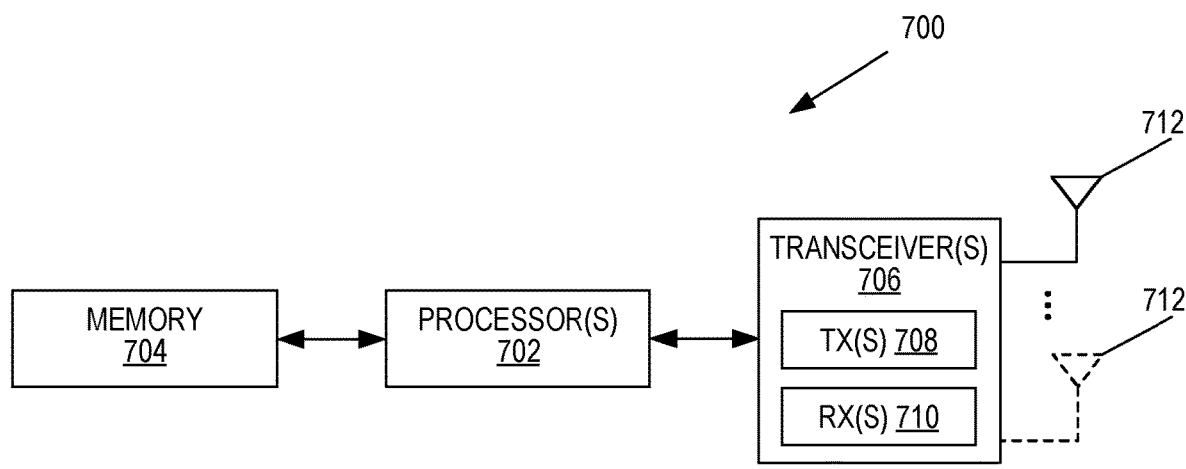
FIGS. 7 and 8 illustrate example embodiments of a wireless device (e.g., a User Equipment (UE))

FIG. 7 is a schematic block diagram of a UE 700 according to some embodiments of the present disclosure. As illustrated, the UE 700 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the UE 700 described above (e.g., one or more functions of a UE or wireless device 212 as described above) may be fully or partially implemented in software that is, e.g., stored in the memory 704 and executed by the processor(s) 702. Note that the UE 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the UE 700 and/or allowing output of information from the UE 700), a power supply (e.g., a battery and associated power circuitry), etc.

In some embodiments, a computer program including instructions which, when executed by at least one processor, causes the at least one processor to carry out the functionality of the UE 700 according to any of the embodiments described herein (e.g., one or more functions of a UE or wireless device 212 as described above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
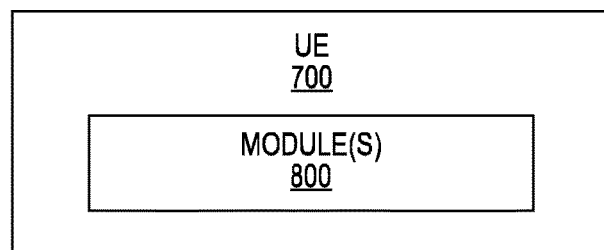

FIG. 8 is a schematic block diagram of the UE 700 according to some other embodiments of the present disclosure. The UE 700 includes one or more modules 800, each of which is implemented in software. The module(s) 800 provide the functionality of the UE 700 described herein (e.g., one or more functions of a UE or wireless device 212 as described above).

Figure 9:
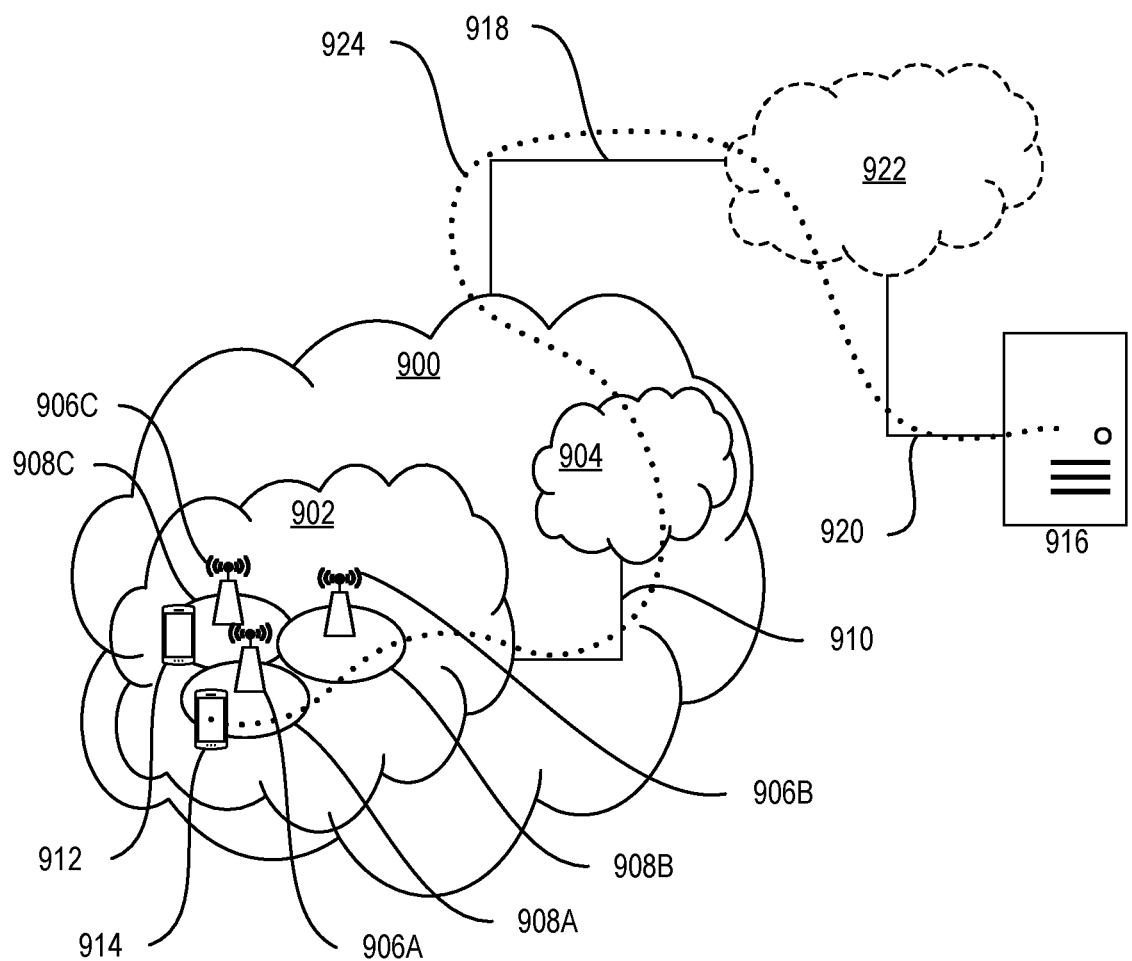
FIG. 9 illustrates an example of a communication system in which embodiments of the present disclosure may be implemented.

With reference to FIG. 9, in accordance with an embodiment, a communication system includes a telecommunication network 900, such as a 3GPP-type cellular network, which comprises an access network 902, such as a RAN, and a core network 904. The access network 902 comprises a plurality of base stations 906A, 906B, 906C, such as Node Bs, eNBs, gNBs, or other types of wireless Access Points (APs), each defining a corresponding coverage area 908A, 908B, 908C. Each base station 906A, 906B, 906C is connectable to the core network 904 over a wired or wireless connection 910. A first UE 912 located in coverage area 908C is configured to wirelessly connect to, or be paged by, the corresponding base station 906C. A second UE 914 in coverage area 908A is wirelessly connectable to the corresponding base station 906A. While a plurality of UEs 912, 914 are illustrated in this example, the disclosed embodiments are equally applicable to a situation where a sole UE is in the coverage area or where a sole UE is connecting to the corresponding base station 906.

The telecommunication network 900 is itself connected to a host computer 916, which may be embodied in the hardware and/or software of a standalone server, a cloud-implemented server, a distributed server, or as processing resources in a server farm. The host computer 916 may be under the ownership or control of a service provider, or may be operated by the service provider or on behalf of the service provider. Connections 918 and 920 between the telecommunication network 900 and the host computer 916 may extend directly from the core network 904 to the host computer 916 or may go via an optional intermediate network 922. The intermediate network 922 may be one of, or a combination of more than one of, a public, private, or hosted network; the intermediate network 922, if any, may be a backbone network or the Internet; in particular, the intermediate network 922 may comprise two or more sub-networks (not shown).

The communication system of FIG. 9 as a whole enables connectivity between the connected UEs 912, 914 and the host computer 916. The connectivity may be described as an Over-the-Top (OTT) connection 924. The host computer 916 and the connected UEs 912, 914 are configured to communicate data and/or signaling via the OTT connection 924, using the access network 902, the core network 904, any intermediate network 922, and possible further infrastructure (not shown) as intermediaries. The OTT connection 924 may be transparent in the sense that the participating communication devices through which the OTT connection 924 passes are unaware of routing of uplink and downlink communications. For example, the base station 906 may not or need not be informed about the past routing of an incoming downlink communication with data originating from the host computer 916 to be forwarded (e.g., handed over) to a connected UE 912. Similarly, the base station 906 need not be aware of the future routing of an outgoing uplink communication originating from the UE 912 towards the host computer 916.

Example implementations, in accordance with an embodiment, of the UE, base station, and host computer discussed in the preceding paragraphs will now be described with reference to FIG. 10. In a communication system 1000, a host computer 1002 comprises hardware 1004 including a communication interface 1006 configured to set up and maintain a wired or wireless connection with an interface of a different communication device of the communication system 1000. The host computer 1002 further comprises processing circuitry 1008, which may have storage and/or processing capabilities. In particular, the processing circuitry 1008 may comprise one or more programmable processors, ASICs, FPGAs, or combinations of these (not shown) adapted to execute instructions. The host computer 1002 further comprises software 1010, which is stored in or accessible by the host computer 1002 and executable by the processing circuitry 1008. The software 1010 includes a host application 1012. The host application 1012 may be operable to provide a service to a remote user, such as a UE 1014 connecting via an OTT connection 1016 terminating at the UE 1014 and the host computer 1002. In providing the service to the remote user, the host application 1012 may provide user data which is transmitted using the OTT connection 1016.

The communication system 1000 further includes a base station 1018 provided in a telecommunication system and comprising hardware 1020 enabling it to communicate with the host computer 1002 and with the UE 1014. The hardware 1020 may include a communication interface 1022 for setting up and maintaining a wired or wireless connection with an interface of a different communication device of the communication system 1000, as well as a radio interface 1024 for setting up and maintaining at least a wireless connection 1026 with the UE 1014 located in a coverage area (not shown in FIG. 10) served by the base station 1018. The communication interface 1022 may be configured to facilitate a connection 1028 to the host computer 1002. The connection 1028 may be direct or it may pass through a core network (not shown in FIG. 10) of the telecommunication system and/or through one or more intermediate networks outside the telecommunication system. In the embodiment shown, the hardware 1020 of the base station 1018 further includes processing circuitry 1030, which may comprise one or more programmable processors, ASICs, FPGAs, or combinations of these (not shown) adapted to execute instructions. The base station 1018 further has software 1032 stored internally or accessible via an external connection.

The communication system 1000 further includes the UE 1014 already referred to. The UE's 1014 hardware 1034 may include a radio interface 1036 configured to set up and maintain a wireless connection 1026 with a base station serving a coverage area in which the UE 1014 is currently located. The hardware 1034 of the UE 1014 further includes processing circuitry 1038, which may comprise one or more programmable processors, ASICs, FPGAs, or combinations of these (not shown) adapted to execute instructions. The UE 1014 further comprises software 1040, which is stored in or accessible by the UE 1014 and executable by the processing circuitry 1038. The software 1040 includes a client application 1042. The client application 1042 may be operable to provide a service to a human or non-human user via the UE 1014, with the support of the host computer 1002. In the host computer 1002, the executing host application 1012 may communicate with the executing client application 1042 via the OTT connection 1016 terminating at the UE 1014 and the host computer 1002. In providing the service to the user, the client application 1042 may receive request data from the host application 1012 and provide user data in response to the request data. The OTT connection 1016 may transfer both the request data and the user data. The client application 1042 may interact with the user to generate the user data that it provides.

Figure 10:
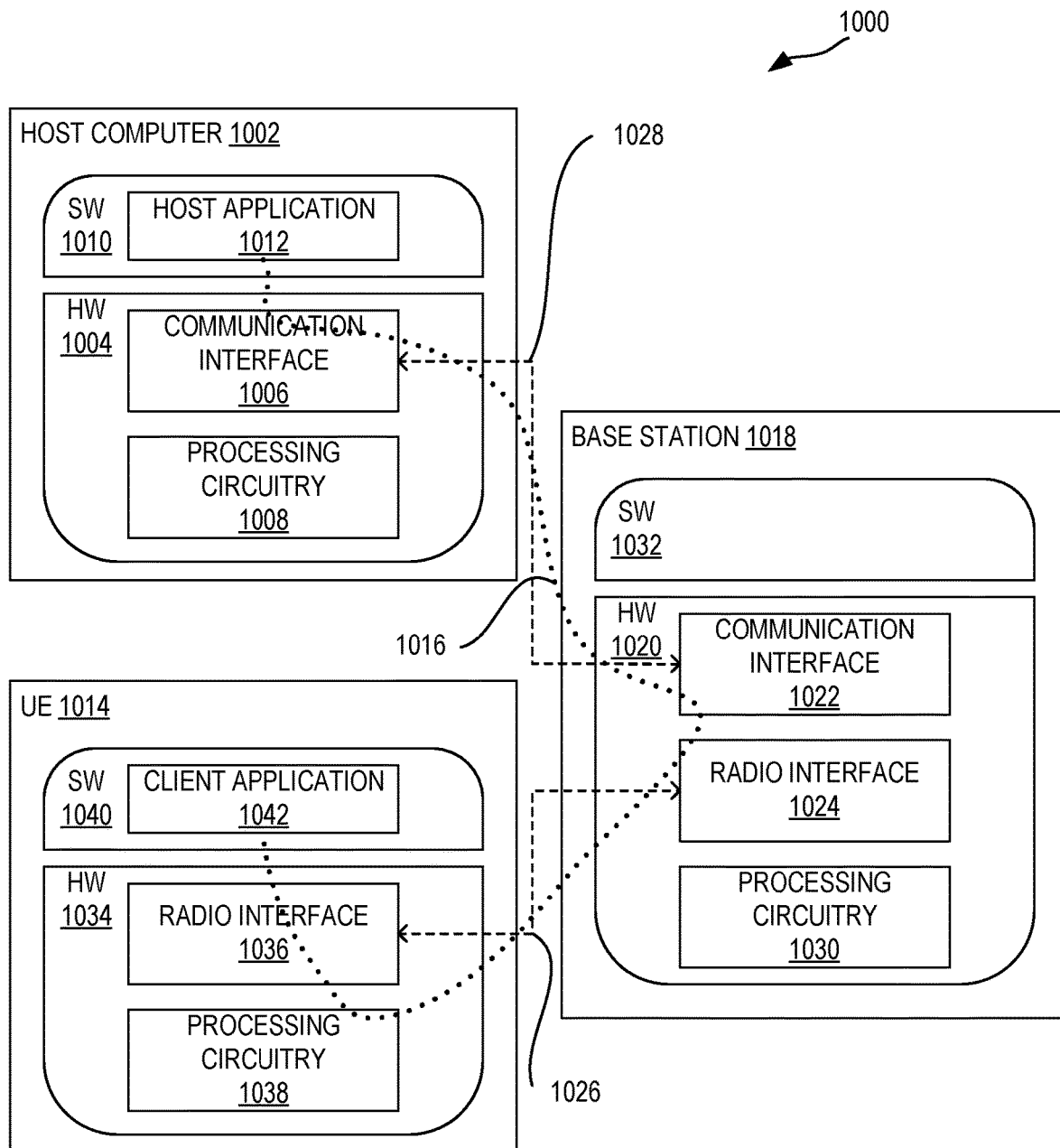
FIG. 10 illustrates example embodiments of the host computer, base station, and UE of the communication system of FIG. 9.

It is noted that the host computer 1002, the base station 1018, and the UE 1014 illustrated in FIG. 10 may be similar or identical to the host computer 916, one of the base stations 906A, 906B, 906C, and one of the UEs 912, 914 of FIG. 9, respectively. This is to say, the inner workings of these entities may be as shown in FIG. 10 and independently, the surrounding network topology may be that of FIG. 9.

In FIG. 10, the OTT connection 1016 has been drawn abstractly to illustrate the communication between the host computer 1002 and the UE 1014 via the base station 1018 without explicit reference to any intermediary devices and the precise routing of messages via these devices. The network infrastructure may determine the routing, which may be configured to hide from the UE 1014 or from the service provider operating the host computer 1002, or both. While the OTT connection 1016 is active, the network infrastructure may further take decisions by which it dynamically changes the routing (e.g., on the basis of load balancing consideration or reconfiguration of the network).

The wireless connection 1026 between the UE 1014 and the base station 1018 is in accordance with the teachings of the embodiments described throughout this disclosure. One or more of the various embodiments improve the performance of OTT services provided to the UE 1014 using the OTT connection 1016, in which the wireless connection 1026 forms the last segment. More precisely, the teachings of these embodiments may improve the, e.g. data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1016 between the host computer 1002 and the UE 1014, in response to variations in the measurement results. The measurement procedure and/or the network functionality for reconfiguring the OTT connection 1016 may be implemented in the software 1010 and the hardware 1004 of the host computer 1002 or in the software 1040 and the hardware 1034 of the UE 1014, or both. In some embodiments, sensors (not shown) may be deployed in or in association with communication devices through which the OTT connection 1016 passes; the sensors may participate in the measurement procedure by supplying values of the monitored quantities exemplified above, or supplying values of other physical quantities from which the software 1010, 1040 may compute or estimate the monitored quantities. The reconfiguring of the OTT connection 1016 may include message format, retransmission settings, preferred routing, etc.; the reconfiguring need not affect the base station 1018, and it may be unknown or imperceptible to the base station 1018. Such procedures and functionalities may be known and practiced in the art. In certain embodiments, measurements may involve proprietary UE signaling facilitating the host computer 1002's measurements of throughput, propagation times, latency, and the like. The measurements may be implemented in that the software 1010 and 1040 causes messages to be transmitted, in particular empty or 'dummy' messages, using the OTT connection 1016 while it monitors propagation times, errors, etc.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1100 (which may be optional), the UE receives input data provided by the host computer. Additionally or alternatively, in step 1102, the UE provides user data. In sub-step 1104 (which may be optional) of step 1100, the UE provides the user data by executing a client application. In sub-step 1106 (which may be optional) of step 1102, the UE executes a client application which provides the user data in reaction to the received input data provided by the host computer. In providing the user data, the executed client application may further consider user input received from the user. Regardless of the specific manner in which the user data was provided, the UE initiates, in sub-step 1108 (which may be optional), transmission of the user data to the host computer. In step 1110 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1200 (which may be optional), in accordance with the teachings of the embodiments described throughout this disclosure, the base station receives user data from the UE. In step 1202 (which may be optional), the base station initiates transmission of the received user data to the host computer. In step 1204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device for receiving and utilizing a resource allocation for one or more partially allocated interlaces in unlicensed spectrum, the method comprising receiving (300) a resource allocation for an uplink transmission in unlicensed spectrum using allocated resources including resources in one or more partially allocated interlaces and performing (302) an uplink transmission on the allocated resources including the resources in the one or more partially allocated interlaces in accordance with the resource allocation.

Embodiment 2: The method of embodiment 1 wherein the resource allocation comprises information that indicates the one or more partially allocated interlaces and, for each partially allocated interlace of the one or more partially allocated interlaces, information that indicates one or more physical resource blocks within the partially allocated interlace that are allocated for the uplink transmission from the wireless device.

Embodiment 3: The method of embodiment 2 wherein the one or more physical resource blocks are a subset of all resource blocks in the partially allocated interlace.

Embodiment 4: The method of embodiment 2 or 3 wherein each physical resource block of the one or more physical resource blocks includes 12 subcarriers.

Embodiment 5: The method of embodiment 2 or 3 wherein each physical resource block of the one or more physical resource blocks includes less or more than 12 subcarriers.

Embodiment 6: The method of any one of embodiments 2 to 5 wherein the information that indicates the one or more partially allocated interlaces comprises a bitmap of length equal to a number of interlaces that can be allocated where bits in the bitmap indicate which interlaces are partially allocated.

Embodiment 7: The method of any one of embodiments 2 to 5 wherein the information that indicates the one or more partially allocated interlaces comprises a bit sequence that maps to a predefined combination of interlaces that are partially allocated.

Embodiment 8: The method of any one of embodiments 2 to 5 wherein the information that indicates the one or more physical resource blocks within the partially allocated interlace that are allocated for the uplink transmission is defined using a modified Resource Allocation, RA, type 0 for a New Radio, NR, resource allocation scheme.

Embodiment 9: The method of any one of embodiments 2 to 5 wherein the information that indicates the one or more physical resource blocks within the partially allocated interlace that are allocated for the uplink transmission is defined using a modified Resource Allocation, RA, type 1 for a New Radio, NR, resource allocation scheme.

Embodiment 10: The method of embodiment 9 wherein the uplink transmission is in a wireless communication network with wideband operations consisting of a number of sub-bands, and the wireless device punctures some physical resource block(s) in a guard band between sub-bands or channels even if the physical resource block(s) are scheduled by the wireless communication network.

Embodiment 11: The method of any one of embodiments 2 to 5 wherein the information that indicates the one or more physical resource blocks within the partially allocated interlace that are allocated for the uplink transmission comprises an index to a predefined table of different allocations of physical resource blocks within the partially allocated interlace.

Embodiment 12: The method of any one of embodiments 2 to 5 wherein the one or more partially allocated interlaces comprise two or more partially allocated interlaces, and the information that indicates the one or more physical resource blocks within each of the partially allocated interlaces is arranged in a predefined order such that the wireless device can determine which information corresponds to which partially allocated interlace.

Embodiment 13: The method of any one of embodiments 2 to 12 wherein the uplink transmission is in a wireless communication network with wideband operations consisting of a number of sub-bands, and the resource allocation further comprises information (e.g., a bitmap) that indicates one or more sub-bands on which the uplink transmission is allocated.

Embodiment 14: The method of any one of embodiments 2 to 13 wherein the information that indicates the one or more physical resource blocks within the partially allocated interlace that are allocated for the uplink transmission indicates which virtual resource blocks are allocated.

Embodiment 15: The method of any one of embodiments 1 to 14 wherein the partially allocated interlace is an interlace that is shared for resource allocations to two or more wireless devices including the wireless device.

Embodiment 16: The method of any of the previous embodiments, further comprising providing user data and forwarding the user data to a host computer via the transmission to the base station.

Group B Embodiments

Embodiment 17: A method performed by a base station for providing, to a wireless device, a resource allocation for one or more partially allocated interlaces in unlicensed spectrum, the method comprising transmitting (300), to a wireless device, a resource allocation for an uplink transmission in unlicensed spectrum using allocated resources including resources in one or more partially allocated interlaces.

Embodiment 18: The method of embodiment 17 wherein the resource allocation comprises information that indicates the one or more partially allocated interlaces and, for each partially allocated interlace of the one or more partially allocated interlaces, information that indicates one or more physical resource blocks within the partially allocated interlace that are allocated for the uplink transmission from the wireless device.

Embodiment 19: The method of embodiment 18 wherein the one or more physical resource blocks are a subset of all resource blocks in the partially allocated interlace.

Embodiment 20: The method of embodiment 18 or 19 wherein each physical resource block of the one or more physical resource blocks includes 12 subcarriers.

Embodiment 21: The method of embodiment 18 or 19 wherein each physical resource block of the one or more physical resource blocks includes less or more than 12 subcarriers.

Embodiment 22: The method of any one of embodiments 18 to 21 wherein the information that indicates the one or more partially allocated interlaces comprises a bitmap of length equal to a number of interlaces that can be allocated where bits in the bitmap indicate which interlaces are partially allocated.

Embodiment 23: The method of any one of embodiments 18 to 21 wherein the information that indicates the one or more partially allocated interlaces comprises a bit sequence that maps to a predefined combination of interlaces that are partially allocated.

Embodiment 24: The method of any one of embodiments 18 to 21 wherein the information that indicates the one or more physical resource blocks within the partially allocated interlace that are allocated for the uplink transmission is defined using a modified Resource Allocation, RA, type 0 for a New Radio, NR, resource allocation scheme.

Embodiment 25: The method of any one of embodiments 18 to 21 wherein the information that indicates the one or more physical resource blocks within the partially allocated interlace that are allocated for the uplink transmission is defined using a modified Resource Allocation, RA, type 1 for a New Radio, NR, resource allocation scheme.

Embodiment 26: The method of embodiment 25 wherein the uplink transmission is in a wireless communication network with wideband operations consisting of a number of sub-bands, and the wireless device punctures some physical resource block(s) in a guard band between sub-bands or channels even if the physical resource block(s) are scheduled by the wireless communication network.

Embodiment 27: The method of any one of embodiments 18 to 21 wherein the information that indicates the one or more physical resource blocks within the partially allocated interlace that are allocated for the uplink transmission comprises an index to a predefined table of different allocations of physical resource blocks within the partially allocated interlace.

Embodiment 28: The method of any one of embodiments 18 to 21 wherein the one or more partially allocated interlaces comprise two or more partially allocated interlaces, and the information that indicates the one or more physical resource blocks within each of the partially allocated interlaces is arranged in a predefined order such that the wireless device can determine which information corresponds to which partially allocated interlace.

Embodiment 29: The method of any one of embodiments 18 to 28 wherein the uplink transmission is in a wireless communication network with wideband operations consisting of a number of sub-bands, and the resource allocation further comprises information (e.g., a bitmap) that indicates one or more sub-bands on which the uplink transmission is allocated.

Embodiment 30: The method of any one of embodiments 18 to 29 wherein the information that indicates the one or more physical resource blocks within the partially allocated interlace that are allocated for the uplink transmission indicates which virtual resource blocks are allocated.

Embodiment 31: The method of any one of embodiments 17 to 30 wherein the partially allocated interlace is an interlace that is shared for resource allocations to two or more wireless devices including the wireless device.

Embodiment 32: The method of any of the previous embodiments, further comprising obtaining user data and forwarding the user data to a host computer.

Group C Embodiments

Embodiment 33: A wireless device for receiving and utilizing a resource allocation for one or more partially allocated interlaces in unlicensed spectrum, the wireless device comprising processing circuitry configured to perform any of the steps of any of the Group A embodiments and power supply circuitry configured to supply power to the wireless device.

Embodiment 34: A base station for providing, to a wireless device, a resource allocation for one or more partially allocated interlaces in unlicensed spectrum, the base station comprising processing circuitry configured to perform any of the steps of any of the Group B embodiments and power supply circuitry configured to supply power to the base station.

Embodiment 35: A User Equipment, UE, for receiving and utilizing a resource allocation for one or more partially allocated interlaces in unlicensed spectrum, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 36: A communication system including a host computer comprising communication interface configured to receive user data originating from a transmission from a User Equipment, UE, to a base station, wherein the UE comprises a radio interface and processing circuitry, the UE's processing circuitry configured to perform any of the steps of any of the Group A embodiments.

Embodiment 37: The communication system of the previous embodiment, further including the UE.

Embodiment 38: The communication system of the previous 2 embodiments, further including the base station, wherein the base station comprises a radio interface configured to communicate with the UE and a communication interface configured to forward to the host computer the user data carried by a transmission from the UE to the base station.

Embodiment 39: The communication system of the previous 3 embodiments, wherein the processing circuitry of the host computer is configured to execute a host application and the UE's processing circuitry is configured to execute a client application associated with the host application, thereby providing the user data.

Embodiment 40: The communication system of the previous 4 embodiments, wherein the processing circuitry of the host computer is configured to execute a host application, thereby providing request data, and the UE's processing circuitry is configured to execute a client application associated with the host application, thereby providing the user data in response to the request data.

Embodiment 41: A method implemented in a communication system including a host computer, a base station, and a User Equipment, UE, the method comprising, at the host computer, receiving user data transmitted to the base station from the UE, wherein the UE performs any of the steps of any of the Group A embodiments.

Embodiment 42: The method of the previous embodiment, further comprising, at the UE, providing the user data to the base station.

Embodiment 43: The method of the previous 2 embodiments, further comprising: at the UE, executing a client application, thereby providing the user data to be transmitted; and, at the host computer, executing a host application associated with the client application.

Embodiment 44: The method of the previous 3 embodiments, further comprising: at the UE, executing a client application; and, at the UE, receiving input data to the client application, the input data being provided at the host computer by executing a host application associated with the client application; wherein the user data to be transmitted is provided by the client application in response to the input data.

Embodiment 45: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 46: The communication system of the previous embodiment further including the base station.

Embodiment 47: The communication system of the previous 2 embodiments, further including the UE, wherein the UE is configured to communicate with the base station.

Embodiment 48: The communication system of the previous 3 embodiments, wherein: the processing circuitry of the host computer is configured to execute a host application; and the UE is configured to execute a client application associated with the host application, thereby providing the user data to be received by the host computer.

Embodiment 49: A method implemented in a communication system including a host computer, a base station, and a User Equipment, UE, the method comprising, at the host computer, receiving, from the base station, user data originating from a transmission which the base station has received from the UE, wherein the UE performs any of the steps of any of the Group A embodiments.

Embodiment 50: The method of the previous embodiment, further comprising at the base station, receiving the user data from the UE.

Embodiment 51: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

µs Microsecond
3GPP Third Generation Partnership Project
5G Fifth Generation
AP Access Point
ASIC Application Specific Integrated Circuit
BI-FDMA Block Interleaved Frequency Division Multiple Access
CPU Central Processing Unit D2D Device-to-Device
dBm Decibel-Milliwatt
DCI Downlink Control Information
DSP Digital Signal Processor
EIRP Equivalent Isotropic Radiated Power
eNB Enhanced or Evolved Node B
EPC Evolved Packet Core
ETSI European Telecommunications Standards Institute
feLAA Further Enhanced License Assisted Access
FPGA Field Programmable Gate Array
GHz Gigahertz
gNB New Radio Base Station
kHz Kilohertz
LBT Listen-Before-Talk
LTE Long Term Evolution
MHz Megahertz
MME Mobility Management Entity
MTC Machine Type Communication
NR New Radio
NR-U New Radio based Access to Unlicensed Spectrum
OCB Occupied Channel Bandwidth
OFDM Orthogonal Frequency Division Multiplexing
OTT Over-the-Top
PDCCH Physical Downlink Control Channel
P-GW Packet Data Network Gateway
PRACH Physical Random Access Channel
PRB Physical Resource Block
PSD Power Spectral Density
PUCCH Physical Uplink Control Channel
PUSCH Physical Uplink Shared Channel
RA Resource Allocation
RAM Random Access Memory
RAN Radio Access Network
RBG Resource Block Group
ROM Read Only Memory
RRH Remote Radio Head
SCEF Service Capability Exposure Function
SCS Subcarrier Spacing
SRS Sounding Reference Signal
TS Technical Specification
UE User Equipment
ULLCC Ultra-Low Latency Critical Communications
US United States
VRB Virtual Resource Block Those skilled in the art will recognize improvements and modifications to the embodiments of the present disclosure. All such improvements and modifications are considered within the scope of the concepts disclosed herein.

The invention claimed is:

1. A method performed by a wireless device, the method comprising:
receiving a resource allocation for an uplink transmission that allocates resources in one or more partially allocated interlaces; and
performing an uplink transmission on allocated resources in the one or more partially allocated interlaces in accordance with the resource allocation;
wherein the resource allocation comprises:
information that indicates the one or more partially allocated interlaces; and
one of the group consisting of:
information that indicates one or more physical resource blocks within the one or more partially allocated interlaces that are allocated for the uplink transmission from the wireless device; and
for each partially allocated interlace of the one or more partially allocated interlaces, information that indicates one or more physical resource blocks within the partially allocated interlace that are allocated for the uplink transmission from the wireless device;
wherein the information that indicates the one or more physical resource blocks is defined using a modified New Radio, NR, Resource Allocation, RA, type 1 resource allocation scheme.

2. The method of claim 1 wherein the resource allocation comprises:
information that indicates one or more physical resource blocks within the one or more partially allocated interlaces that are allocated for the uplink transmission from the wireless device.

3. The method of claim 2 wherein the information that indicates the one or more partially allocated interlaces comprises a bitmap of length equal to a number of interlaces that can be allocated where bits in the bitmap indicate which interlaces are partially allocated.

4. The method of claim 2 wherein the information that indicates the one or more partially allocated interlaces comprises a bit sequence that maps to a predefined combination of interlaces that are partially allocated.

5. The method of claim 1 wherein the resource allocation comprises:
for each partially allocated interlace of the one or more partially allocated interlaces, information that indicates one or more physical resource blocks within the partially allocated interlace that are allocated for the uplink transmission from the wireless device.

6. The method of claim 5 wherein the information that indicates the one or more physical resource blocks for each partially allocated interlace is common information that indicates the one or more physical resource blocks for each partially allocated interlace.

7. The method of claim 1 wherein the uplink transmission is in a wireless communication network with wideband operations consisting of a number of sub-bands, and the wireless device excludes some physical resource block(s) in a guard band between sub-bands or channels.

8. The method of claim 1 wherein the uplink transmission is in a wireless communication network with wideband operations consisting of a number of sub-bands, and the start and length of the one or more sub-bands are indicated by the modified NR RA type 1 resource allocation scheme.

9. A wireless device for a cellular communications system, the wireless device adapted to:
receive a resource allocation for an uplink transmission that allocates resources in one or more partially allocated interlaces; and
perform an uplink transmission on the allocated resources in the one or more partially allocated interlaces in accordance with the resource allocation;
wherein the resource allocation comprises:
information that indicates the one or more partially allocated interlaces; and
one of the group consisting of:
information that indicates one or more physical resource blocks within the one or more partially allocated interlaces that are allocated for the uplink transmission from the wireless device; and
for each partially allocated interlace of the one or more partially allocated interlaces, information that indicates one or more physical resource blocks within the partially allocated interlace that are allocated for the uplink transmission from the wireless device;

wherein the information that indicates the one or more physical resource blocks is defined using a modified New Radio, NR, Resource Allocation, RA, type 1 resource allocation scheme.

10. A method performed by a base station comprising:
transmitting, to a wireless device, a resource allocation for an uplink transmission that allocates resources in one or more partially allocated interlaces;
wherein the resource allocation comprises:
information that indicates the one or more partially allocated interlaces; and
one of the group consisting of:
information that indicates one or more physical resource blocks within the one or more partially allocated interlaces that are allocated for the uplink transmission from the wireless device; and
for each partially allocated interlace of the one or more partially allocated interlaces, information that indicates one or more physical resource blocks within the partially allocated interlace that are allocated for the uplink transmission from the wireless device;
wherein the information that indicates the one or more physical resource blocks is defined using a modified New Radio, NR, Resource Allocation, RA, type 1 resource allocation scheme.

11. The method of claim 10 wherein the resource allocation comprises:
information that indicates one or more physical resource blocks within the one or more partially allocated interlaces that are allocated for the uplink transmission from the wireless device.

12. The method of claim 11 wherein the information that indicates the one or more partially allocated interlaces comprises a bitmap of length equal to a number of interlaces that can be allocated where bits in the bitmap indicate which interlaces are partially allocated.

13. The method of claim 11 wherein the information that indicates the one or more partially allocated interlaces comprises a bit sequence that maps to a predefined combination of interlaces that are partially allocated.

14. The method of claim 11 wherein the uplink transmission is in a wireless communication network with wideband operations consisting of a number of sub-bands, and the wireless device excludes some physical resource block(s) in a guard band between sub-bands or channels.

15. The method of claim 11 wherein the uplink transmission is in a wireless communication network with wideband operations consisting of a number of sub-bands, and the start and length of the one or more sub-bands are indicated by the modified NR RA type 1 resource allocation scheme.

16. The method of claim 10 wherein the resource allocation comprises:
for each partially allocated interlace of the one or more partially allocated interlaces, information that indicates one or more physical resource blocks within the partially allocated interlace that are allocated for the uplink transmission from the wireless device.

17. The method of claim 16 wherein the information that indicates the one or more physical resource blocks for each partially allocated interlace is common information that indicates the one or more physical resource blocks for each partially allocated interlace.

18. A base station for a cellular communications system, the base station adapted to:
transmit, to a wireless device, a resource allocation for an uplink transmission that allocates resources in one or more partially allocated interlaces;
wherein the resource allocation comprises:
information that indicates the one or more partially allocated interlaces; and
one of the group consisting of:
information that indicates one or more physical resource blocks within the one or more partially allocated interlaces that are allocated for the uplink transmission from the wireless device; and
for each partially allocated interlace of the one or more partially allocated interlaces, information that indicates one or more physical resource blocks within the partially allocated interlace that are allocated for the uplink transmission from the wireless device;
wherein the information that indicates the one or more physical resource blocks is defined using a modified New Radio, NR, Resource Allocation, RA, type 1 resource allocation scheme.

* * * * *